United States Patent
Zhang et al.

(10) Patent No.: US 12,468,981 B2
(45) Date of Patent: Nov. 11, 2025

(54) DATABASE RESOURCE MANAGEMENT USING PREDICTIVE MODELS

(71) Applicant: INTERNATIONAL BUSINESS MACHINES CORPORATION, Armonk, NY (US)

(72) Inventors: Hong Mei Zhang, Haidian District (CN); Shuo Li, Beijing (CN); Xiaobo Wang, Beijing (CN); Sheng Yan Sun, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 17/557,303

(22) Filed: Dec. 21, 2021

(65) Prior Publication Data

US 2023/0196182 A1 Jun. 22, 2023

(51) Int. Cl.
*G06N 20/00* (2019.01)
*G06F 9/48* (2006.01)
(Continued)

(52) U.S. Cl.
CPC ........... *G06N 20/00* (2019.01); *G06F 9/4881* (2013.01); *G06F 16/256* (2019.01); *G06F 16/27* (2019.01)

(58) Field of Classification Search
None
See application file for complete search history.

(56) References Cited

U.S. PATENT DOCUMENTS

2018/0018570 A1* 1/2018 Mizoguchi ............. G06F 17/18
2019/0354407 A1 11/2019 Booss et al.
(Continued)

FOREIGN PATENT DOCUMENTS

CN 107085539 8/2017

OTHER PUBLICATIONS

Yu, Fuxun, Weishan Zhang, Zhuwei Qin, Zirui Xu, Di Wang, Chenchen Liu, Zhi Tian, and Xiang Chen. "Heterogeneous federated learning." arXiv preprint arXiv:2008.06767. [v1] Aug. 15, 2020. 9 pages. (Year: 2020).*
(Continued)

*Primary Examiner* — Vincent Gonzales
(74) *Attorney, Agent, or Firm* — Eric Chesley; Andrew D. Wright; Calderon Safran & Wright P.C.

(57) ABSTRACT

Systems and methods are provided to predict connection configurations in a distributed database environment. In embodiments, a method includes: building, by a computing device, a dynamic machine learning predictive model for a first new node connection in a distributed database environment based on configuration data of the first new node connection; determining, by the computing device, a group of nodes in the distributed database environment of a same type of node as the new node connection; federating, by the computing device, the dynamic machine learning predictive model of the first new node connection with other dynamic machine learning predictive models of other nodes in the group of nodes, thereby generating a federated predictive model for the same type of node; and generating, by the computing device, a predicted connection configuration for a second new node connection of the same type of node using the federated predictive model.

20 Claims, 10 Drawing Sheets

(51) Int. Cl.
*G06F 16/25* (2019.01)
*G06F 16/27* (2019.01)

(56) References Cited

U.S. PATENT DOCUMENTS

| | | | | |
|---|---|---|---|---|
| 2020/0133725 | A1* | 4/2020 | Thomas | G06F 9/4893 |
| 2021/0089534 | A1 | 3/2021 | Joshi et al. | |
| 2021/0337031 | A1* | 10/2021 | Patil | H04W 40/22 |
| 2022/0245459 | A1* | 8/2022 | Laskaridis | G06N 3/082 |

OTHER PUBLICATIONS

Nguyen, Dinh C., Ming Ding, Quoc-Viet Pham, Pubudu N. Pathirana, Long Bao Le, Aruna Seneviratne, Jun Li, Dusit Niyato, and H. Vincent Poor. "Federated learning meets blockchain in edge computing: Opportunities and challenges." IEEE Internet of Things Journal 8, No. 16. Apr. 13, 2021. 20 pages. (Year: 2021).*

Ghosh, Avishek, Justin Hong, Dong Yin, and Kannan Ramchandran. "Robust federated learning in a heterogeneous environment." arXiv preprint arXiv:1906.06629. Oct. 9, 2019. 26 pages. (Year: 2019).*

Ghosh, Avishek, Jichan Chung, Dong Yin, and Kannan Ramchandran. "An efficient framework for clustered federated learning." Advances in neural information processing systems 33 (2020). 12 pages. (Year: 2020).*

Mell et al., "The NIST Definition of Cloud Computing", NIST, Special Publication 800-145, Sep. 2011, 7 pages.

Unknown et al., "Method for Automated and Elastic Resource Adaption of a Shared Disk Database Management System", IP.com No. IPCOM000266073D, Jun. 10, 2021, 10 pages.

* cited by examiner

DATABASE RESOURCE MANAGEMENT USING PREDICTIVE MODELS

BACKGROUND

Aspects of the present disclosure relate generally to database systems and, more particularly, to database management using predictive machine learning models.

With the increased development in cloud technologies, more services have been migrated to cloud platforms. A cloud-service platform can benefit from relatively cheaper and higher performance system resources. Distributed database systems are one example of a system that leverages a higher capacity available from cloud platforms.

In general, machine learning is the use of algorithms and statistical models by computers to analyze and draw inferences from patterns in data in order to learn and adapt without following explicit instructions. Machine learning algorithms build models based on sample data (e.g., training data) in order to make predictions or decisions without being explicitly programed to do so. Machine learning models may learn and adapt over time utilizing incoming data in a particular domain (e.g., subject area).

In general, federated learning enables multiple actors to build a common, machine learning model without sharing data. In one federated approach, parties jointly train a global machine learning model with the help of a centralized aggregator.

SUMMARY

In a first aspect of the disclosure, there is a computer-implemented method including: building, by a computing device, a dynamic machine learning predictive model for a first new node connection in a distributed database environment based on configuration data of the first new node connection; determining, by the computing device, a group of nodes in the distributed database environment of a same type of node as the first new node connection; federating, by the computing device, the dynamic machine learning predictive model of the first new node connection with other dynamic machine learning predictive models of other nodes in the group of nodes, thereby generating a federated predictive model for the type of node; and generating, by the computing device, a predicted connection configuration for a second new node connection of the same type of node using the federated predictive model.

In another aspect of the disclosure, there is a computer program product including one or more computer readable storage media having program instructions collectively stored on the one or more computer readable storage media. The program instructions are executable to: build a self-organized centerless network of nodes in a distributed database environment, the self-organized centerless networks of nodes including a group of nodes of a same type of node; build a dynamic machine learning predictive model for a first new node connection of a first new node in the distributed database environment based on configuration data of the first new node connection, wherein the first new node is of the same type of node as the group of nodes; federate the dynamic machine learning predictive model of the first new node connection with other dynamic machine learning predictive models of other nodes in the group of nodes, thereby generating a federated predictive model for the same type of node; and generate a predicted connection configuration for a second new node connection of a second new node of the same type of node using the federated predictive model.

In another aspect of the disclosure, there is system including a processor, a computer readable memory, one or more computer readable storage media, and program instructions collectively stored on the one or more computer readable storage media. The program instructions are executable to: build a dynamic machine learning predictive model for a first new node connection in a distributed database environment based on configuration data of the first new node connection; determine a group of nodes in the distributed database environment of a same type of node as the new node connection; federate the dynamic machine learning predictive model of the first new node connection with other dynamic machine learning predictive models of other nodes in the group of nodes, thereby generating a federated predictive model for the same type of node; generate a predicted connection configuration for a second new node connection of the same type of node using the federated predictive model; and schedule resource usage for the second new node connection based on the predicted connection configuration for the second new node connection.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
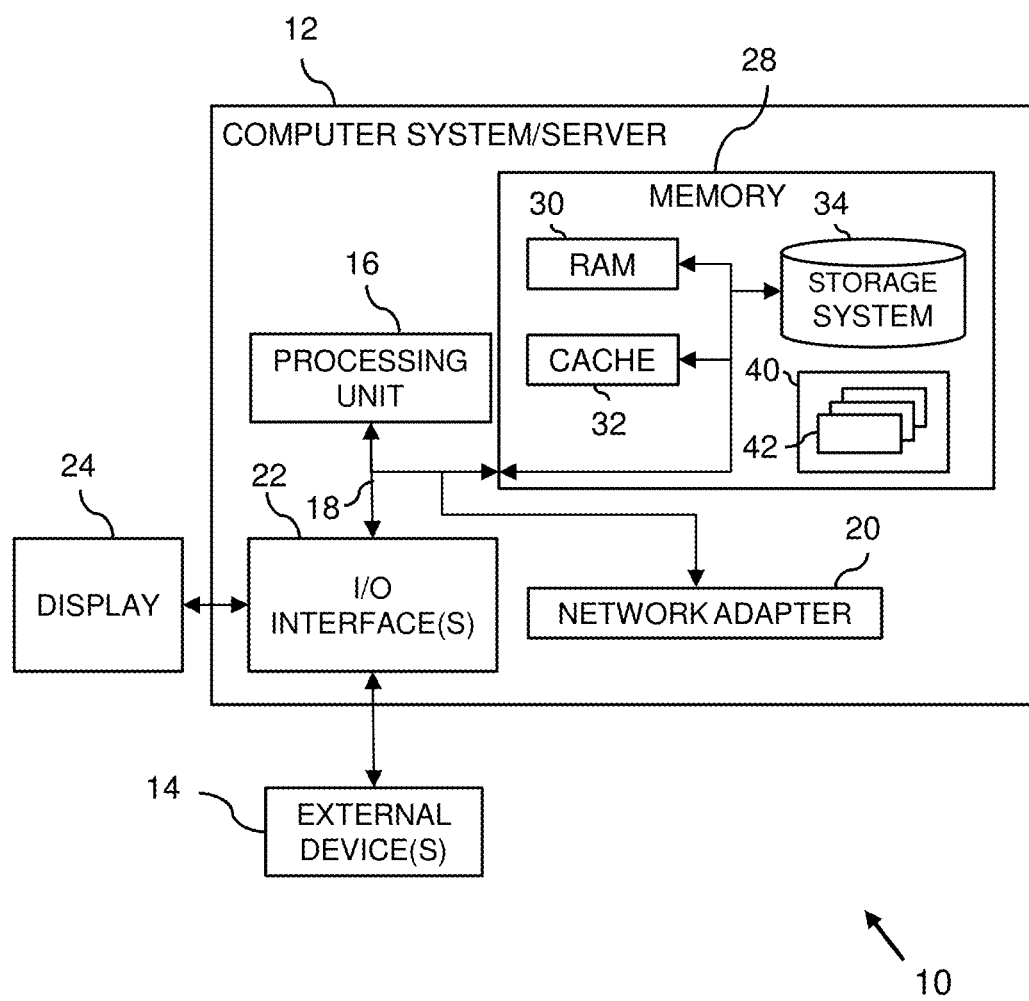
FIG. 1 depicts a cloud computing node according to an embodiment of the present disclosure.

Aspects of the present disclosure relate generally to database systems and, more particularly, to database management using predictive machine learning models. In embodiments, a database management system is provided to leverage cloud database characteristics to build a dynamic high performance distributed database, predict database activity using existing connection status and usage, manage data using data stream management, and share predictive models between similar (correlated) cloud nodes having similar usage. In implementations, when a database server receives a new connection thread in a connection queue, the database server utilizes a predictive model to determine, based on a connection type of the new connection, performance indicators associated with the type of connection, and prepares a connection configuration for the new connection based on the performance indicators. The term thread as used herein refers to objects within a process that run program instructions. In general, threads allow concurrent operations within a process so that a process can run distinct parts of its program simultaneously on different processors.

While leveraging the capacity of cloud platforms has benefits for a user, problems may still exist at the database level, even when executing a simple structured query language (SQL) query, for example. With respect to a software application communicating with a distributed database, a software developer often spends the majority of their development efforts on function development, and may not spend time optimizing the design of the software application for the best performance in a cloud environment. Accordingly, tuning a database to optimize interactions with software applications is often a focus of data administrators and managers. Data administrators will often try different configurations to optimize databases. In general, there exist options for effective resource usage (e.g., buffer pool tuning), but other aspects of resource management require further consideration.

As more nodes are added to a distributed database, the communication costs increase. Database access threads that run according to the rules of different bind options can hold package locks and table space intent locks that can effectively block a user's ability to modify program objects, invoke utilities, or bind or rebind packages. With this usage, there are some gaps between real usage and idol connections, and the need to resume a connection with a balanced resource is a key pain point for the whole communication status.

In some distributed databases, a distributed data facility command enables a user to change the processing rules that a database uses for database access threads. In one example, a MAXDBAT parameter specifies the maximum number of database access threads (DBATs) that are allowed to be concurrently active. Similarly, a CONDBAT parameter sets a maximum number of concurrent inbound distributed data facility (DDF) connections that are to be allowed. A MAXCONQN parameter specifies the maximum number of inactive or new connection requests that can be queued waiting for a DBAT to process the new connection request. A MAXCONQW parameter specifies a maximum length of time that a client connection waits for a DBAT to process a next unit-of-work or new connection request.

Advantageously, implementations of the disclosure may constitute an improvement to distributed database systems by enabling a database manager to decrease gaps between real thread usage and idol thread connections, thereby improving the efficiency of database devices in the distributed database systems. In embodiments, a system and method is provided for: tracing the priorities of a workload and resource usage of a database resource; establishing communication between members in a group of similar nodes, and predicting the future of the resource usage; and scheduling resource managers to perform actual future resource allocation or deallocation. In implementations, a system of the disclosure is configured to generate federated models incorporating machine learning models from similar nodes (entities) in a networked group of nodes.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
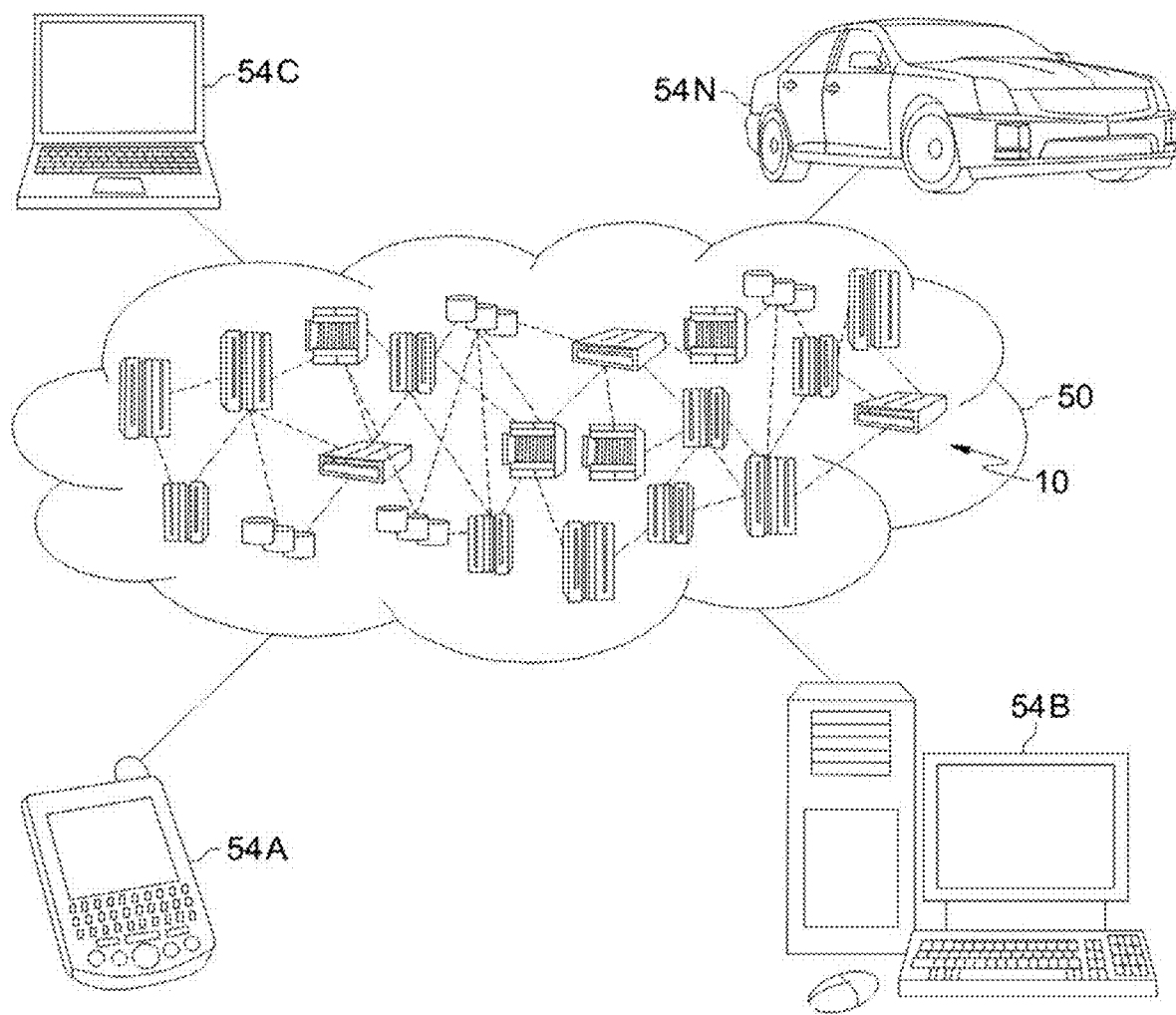
FIG. 2 depicts a cloud computing environment according to an embodiment of the present disclosure.

Referring now to FIG. 2, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
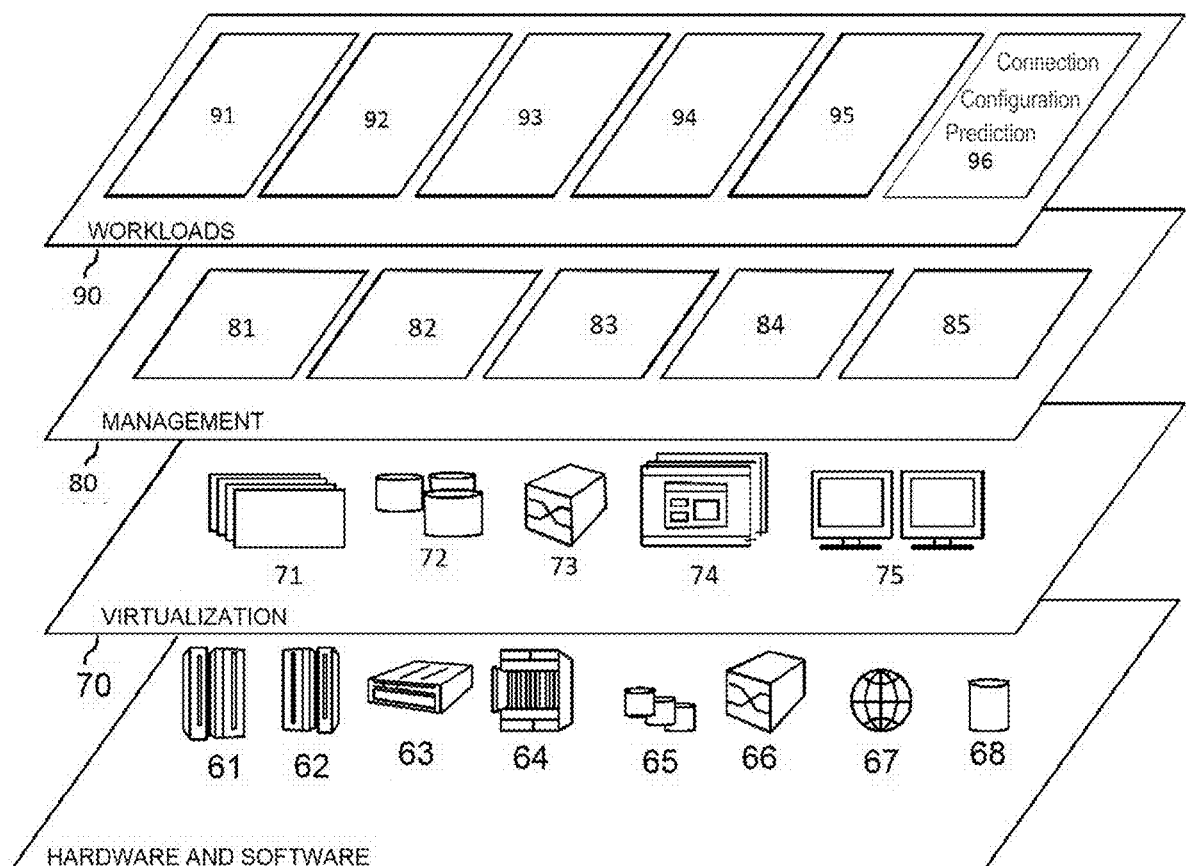
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and connection configuration prediction 96.

Implementations of the disclosure may include a computer system/server 12 of FIG. 1 in which one or more of the program modules 42 are configured to perform (or cause the computer system/server 12 to perform) one of more functions of the connection configuration prediction 96 of FIG. 3. For example, the one or more of the program modules 42 may be configured to: identify a first new node connection within a distributed database environment; build a dynamic predictive model for the first new node connection; determine groups of similar nodes in the distributed database environment; federate the predictive models for each connection in the group of similar nodes to generate a federated predictive model; determine that a second new connection is initiated between a node in the group of similar nodes and another node in the distributed database environment; use the federated predictive model to predict a connection configuration for the second new node connection based on a category or type of the second new node connection; and calculate and schedule resource usage of the second new node connection based on the predicted connection configuration.

Figure 4:
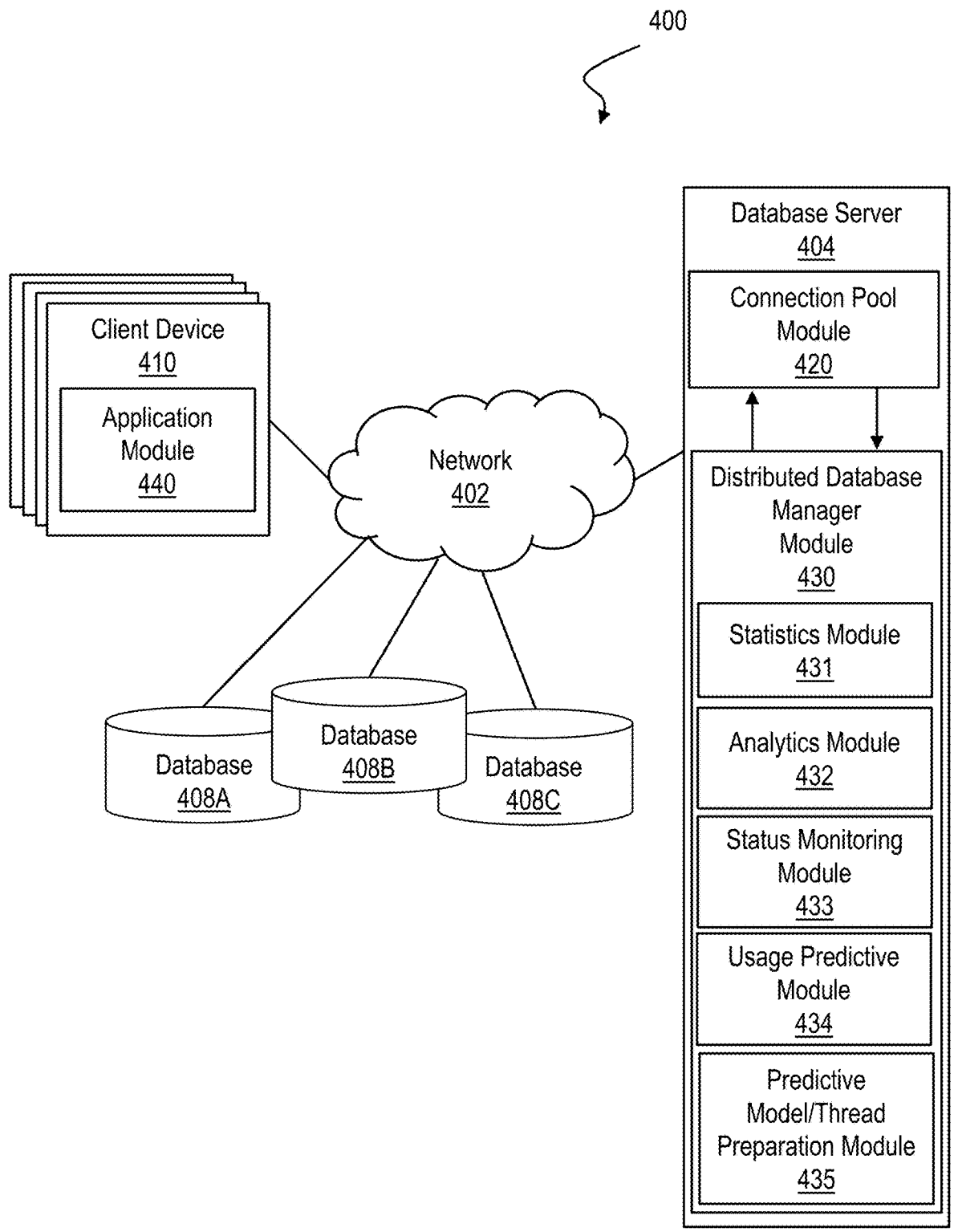
FIG. 4 shows a block diagram of an exemplary environment in accordance with aspects of the disclosure.

FIG. 4 shows a block diagram of an exemplary distributed database environment 400 in accordance with aspects of the disclosure. In the example of FIG. 4, a network 402 is configured to enable communication between a database server 404 and one or more databases represented at 408A-408C and one or more client devices 410. The database server 404, each of the one or more databases 408A-408C, and each of the one or more client devices 410 may each comprise the computer system/server 12 of FIG. 1, or elements thereof. The database server 404, each of the one or more databases 408A-408C, and each of the one or more client devices 410 may be computing nodes 10 in the cloud computing environment 50 of FIG. 2. In implementations, the database server 404 is configured to provide database management services to one or more users in the cloud computing environment 50 of FIG. 2. In implementations, one or more client devices 410 may be local computing devices used by cloud consumers in the cloud computing environment 50 of FIG. 2 (e.g., PDA or cellular telephone 54A, desktop computer 54B, laptop computer 54C, and/or automobile computer system 54N).

In embodiments, the database server 404 comprises one or more modules, each of which may comprise one or more program modules such as program modules 42 described with respect to FIG. 1. In the example of FIG. 4, the database server 404 includes a connection pool module 420, and a distributed database manager module 430 including a statistics module 431, an analytics module 432, a status monitoring module 433, a usage predictive module 434 and a predictive model and thread preparation module 435, each of which may comprise one or more program module(s) 42 of FIG. 1, for example.

In embodiments, the database server 404 provides distributed data management services to users of the environment 400. In implementations, a distributed database structure is utilized to obtain basic statistics and object definitions. In embodiments, the database server 404 provides a data management interface for data interchange. In aspects of the disclosure, a distributed data management data stream includes architected commands, parameters, objects, and messages. Data stream structures may comprise request and reply data stream structures that are used for commands and reply messages executed at the database server 404 (to carry data). In implementations, data communication functions of the database server 404 include sending messages and receiving replies, and adding command requests to a data stream structure (DSS) chain. In embodiments the database server 404 acts as a transaction manager to initialize startup and shutdown, coordinate COMMIT and ROLLBACK commands, and participates in database start-up and shut-down.

In embodiments, each of the one or more client devices 410 comprises one or more modules, each of which may comprise one or more program modules such as program modules 42 described with respect to FIG. 1. In the example of FIG. 4, the client devices 410 each include an application module 440 (e.g., including one or more program module(s) 42 of FIG. 1) configured to enable communicate between a software application of the client device and the database server 404 and/or the databases 408A-408C.

In embodiments, every node or base site in the distributed database environment 400 can be regarded as a dynamic predictive model including its neighbor's database characteristics, and all neighbor nodes in a group will contribute to the dynamic output to predict a recommended connection preparation configuration for the newly joined node. In embodiments, the database server 404 includes cloud computing architecture for automated deployment and load balancing of the distributed databases 408A-408C, and shares predictive models with nodes with similar traffic usage.

The database server 404, databases 408A-408C and client device 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
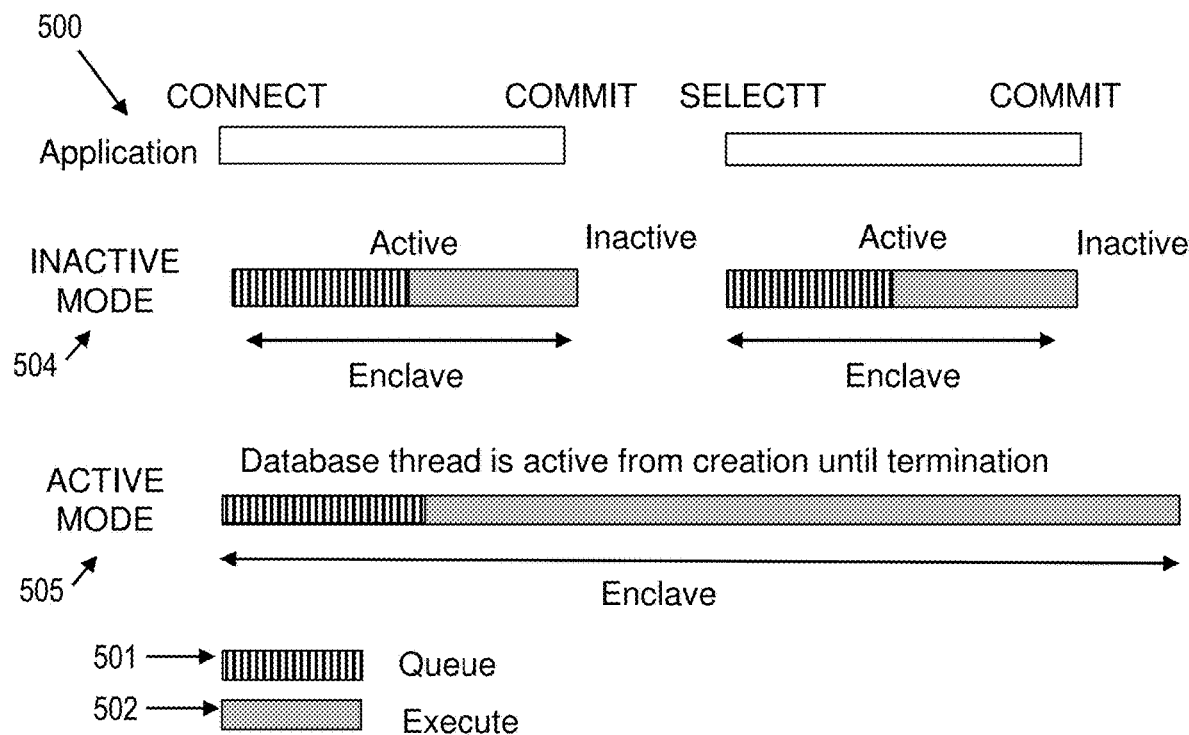
FIG. 5 depicts an exemplary connection status management display for a distributed storage system.

FIG. 5 depicts an exemplary connection status management display for a distributed storage system. In embodiments, the database server 404 provides a connection status management display to users (e.g., users at client devices 410). In implementations, when an application is connected to the database server 404 and is performing database activities, an active or inactive status or queue status is shown. Specifically, in the example of FIG. 5, status of an application 500 is shown, wherein a queue status 501 is represented by a series of vertical lines, and an execute status 502 is represented by solid color. An inactive mode 504 and an active mode 504 are represented.

Figure 6:
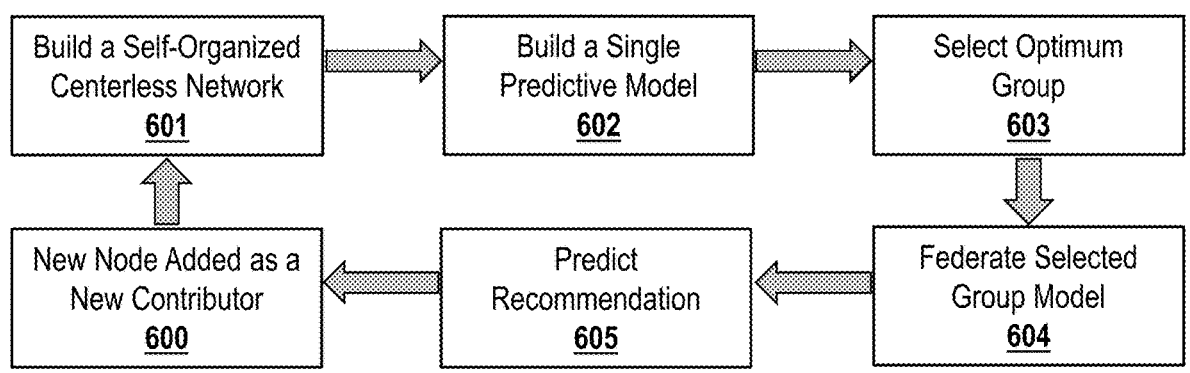
FIG. 6 is a diagram depicting an overview of a dynamic resource recycling process according to embodiments of the disclosure.

FIG. 6 is a diagram depicting an overview of a dynamic resource recycling process according to embodiments of the disclosure. Operations of the process may be carried out in the environment of FIG. 4 and are described with reference to elements depicted in FIG. 4. At operation 600, a new node (e.g., new client device 410) is added to the distributed database environment 400 as a new data contributor. At operation 601, the database server 404 builds a self-organized centerless network comprising groups of nodes having similar data usage characteristics. At operation 602, the database server 404 builds a machine learning predictive model for a node connection. At operation 603, the database server 404 selects a group of nodes having similar characteristics based on the type of connections they are making with other nodes. At operation 604, the database server 404 federates individual predictive models for the selected group of similar nodes into a federated predictive model. In implementations, once a group of nodes is identified having similar characteristics, the database server 404 federates the machine learning predictive models for all connection made by that group of nodes to obtain a federated machine learning model that can be used to predict connection usage for similar new nodes. At operation 605, the database server 404 utilizes the federated predictive model to generate a prediction recommendation for a new node connection in a connection queue.

Figure 7:
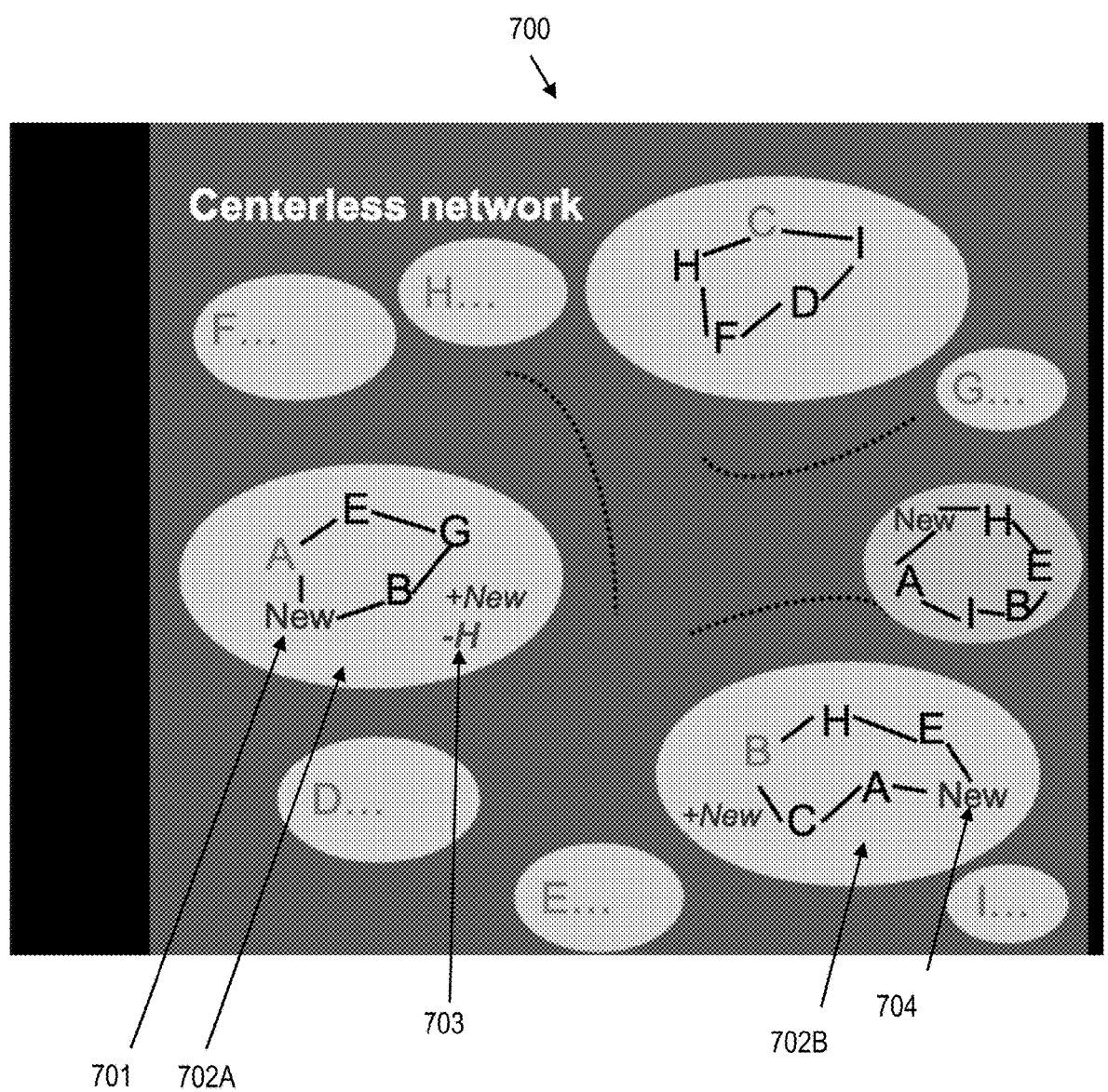
FIG. 7 depicts a centerless network of connecting nodes of a distributed storage system according to embodiments of the disclosure.

FIG. 7 depicts a centerless network 700 of connecting nodes (e.g., A, B, C, D, E, F, G, H, New) in a distributed storage system according to embodiments of the disclosure. In general, a centerless network 700 changes constantly, as represented by the new communication connections between nodes. See for example the "New" node 701 connected to node A and node B in the group of nodes 702B. See also the node "-H" that is disconnected from other nodes in the group 702A at 703. Another "New" node is shown added to group 702B at 704, for example.

In implementations, every base connection between an application (e.g., an application of a client device 410) and a database (e.g., database 408A) in the distributed database environment 400 is regarded as a dynamic predictive model including its activity characteristics, and all related connections will contribute to a dynamic output enabling the database server 404 to predict a new combined resource preparation. Table 1 shown below illustrates exemplary connection configuration parameters and their associated description.

TABLE 1

Exemplary Connection Configuration Parameters

| PARAMETER | DESCRIPTION |
| --- | --- |
| CMTSTAT | Controls whether threads are made ACTIVE or INACTIVE |
| MAXDBAT (Max Remote Active Field) | Maximum number of database access threads (DBATs) allowed to be concurrently active. Requests are queued once MAXDBAT is reached. |
| CONDBAT | Sets a maximum number of concurrent inbound connections allowed. Connections over the CONBAT are rejected. |
| POOLINAC | DBAT can remain idle in pool |
| IDTHTOIN | Idle thread timeout interval |
| MAXCONQN | Max number of inactive waiting for a DBAT |
| MAXCONQW | Max time of client connection waits for DBAT (OFF) |

Figure 8:
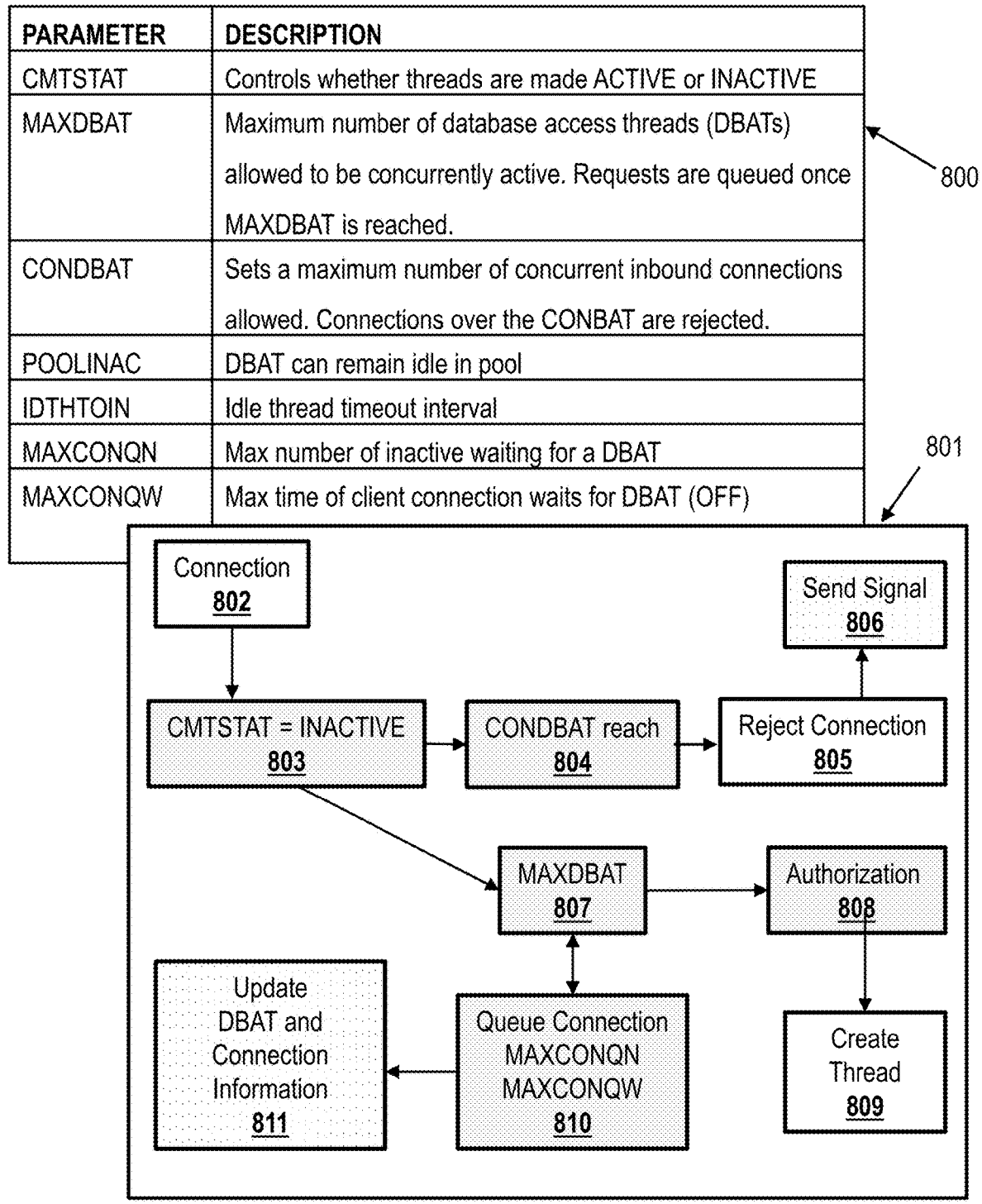
FIG. 8. depicts an exemplary connection predictive model according to embodiments of the disclosure.

FIG. 8. depicts an exemplary connection predictive model according to embodiments of the disclosure. In embodiments, every connection of a node to another node in the distributed database environment 400 is used by the database server 404 to generates a dynamic predictive model (e.g., dynamic predictive model 801). In the example of FIG. 8, a connection between nodes (e.g., an application and a database 408A) is initiated at 802. At 803, the parameter CMTSTAT is set as inactive. If the connection at 802 is over a predetermined maximum number of concurrent inbound connections allowed (CONBAT) as indicated at 804, a database manager (e.g., database server 404) rejects the connection at 805 and sends a signal to the originating node at 806. However, if the connection at 802 is not over the CONBAT and is not over a predetermined maximum number of database access threads (DBATs) allowed to be concurrently active (MAXBAT), the database manager verifies authorization at 808, and creates a connection thread at

809. Alternatively, if the connection at 802 is not over the CONBAT, but the MAXBAT has been reached, the database manager will queue the connection at 810 in a connection queue in accordance with MAXCONQN and MAXCONQW, and will update a database connection thread and connection information at 811. MAXCONQN is a parameter specifying a maximum number of inactive or new request that can be queued waiting for a DBAT to process the request. MAXCONQW is a parameter specifying a maximum length of time that a client connection waits for a DBAT to process the next unit of work or new connection request.

Figure 9:
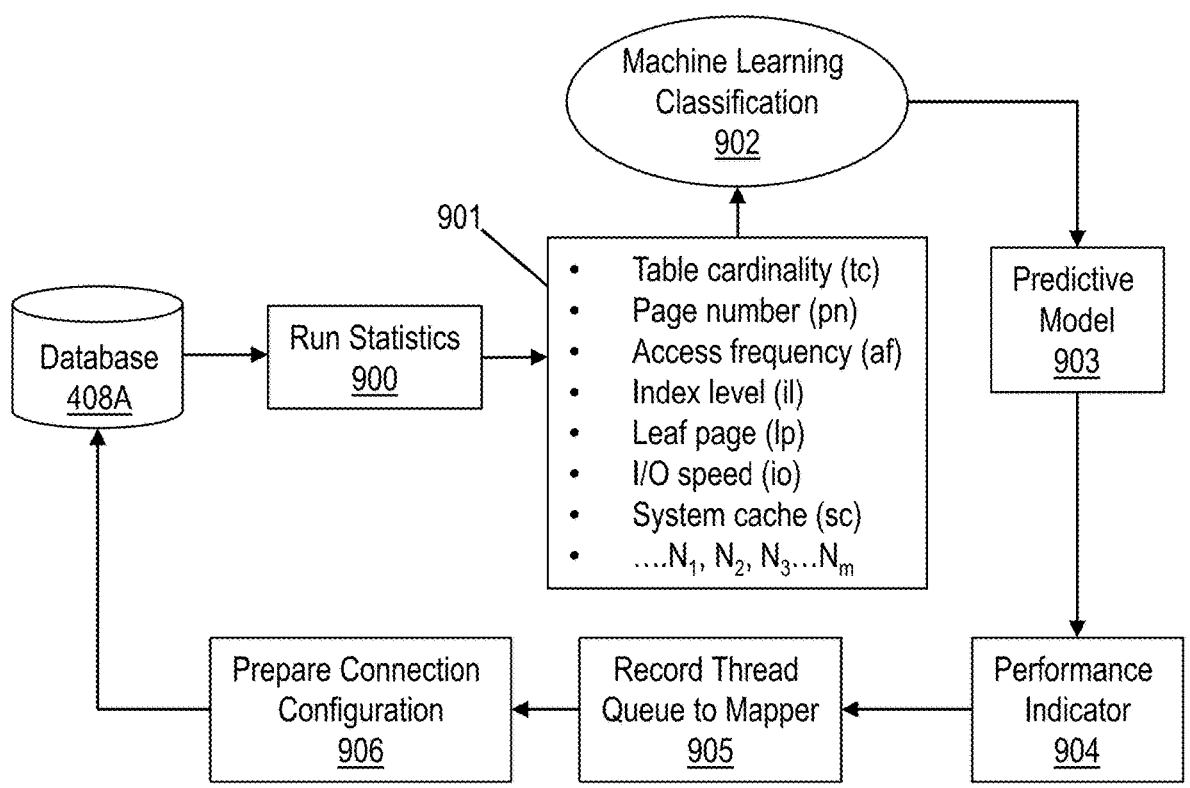
FIG. 9 is a flow diagram illustrating the generation and use of a machine learning predictive model according to embodiments of the disclosure.

FIG. 9 is a flow diagram illustrating the generation and use of a machine learning predictive model according to embodiments of the disclosure. Operations depicted in FIG. 9 may be carried out in the environment of FIG. 4 and are described with reference to elements depicted in FIG. 4.

At operation 900, the database server 404 obtains real-time statistics data for the performance of a connection from the database 408A, and determines performance indicators 901 (e.g., table cardinality, etc.) for the connection. In the example of FIG. 9, performance indicators include table cardinality (tc), page number (pn), access frequency (af), index level (il), leaf page (lp), input/output (i/o) speed (io), system cache (sc), and others ($N_1$-$N_m$). The database server 404 then performs a machine learning classification of the performance indicators (assigning a predetermined class label to the performance indicators as input examples) at 902. The database server 404 uses a predictive model and the training dataset (connection data) at 903 to calculate how to best map examples of input data (performance indicators 904) to specific class labels. At operation 905, the database server 404 maps the number and type of connection threads predicted to be inactive and active based on the performance indicators and prepares a connection configuration at 906 based on the mapping. In embodiments, when the database server 404 receives a new connection thread in a connection queue, the database server 404 utilizes the predictive model 903 to determine, based on a connection type of the new connection, performance indicators 901 associated with the type of connection, and prepares a connection configuration for the new connection based on the performance indicators 901.

Figure 10:
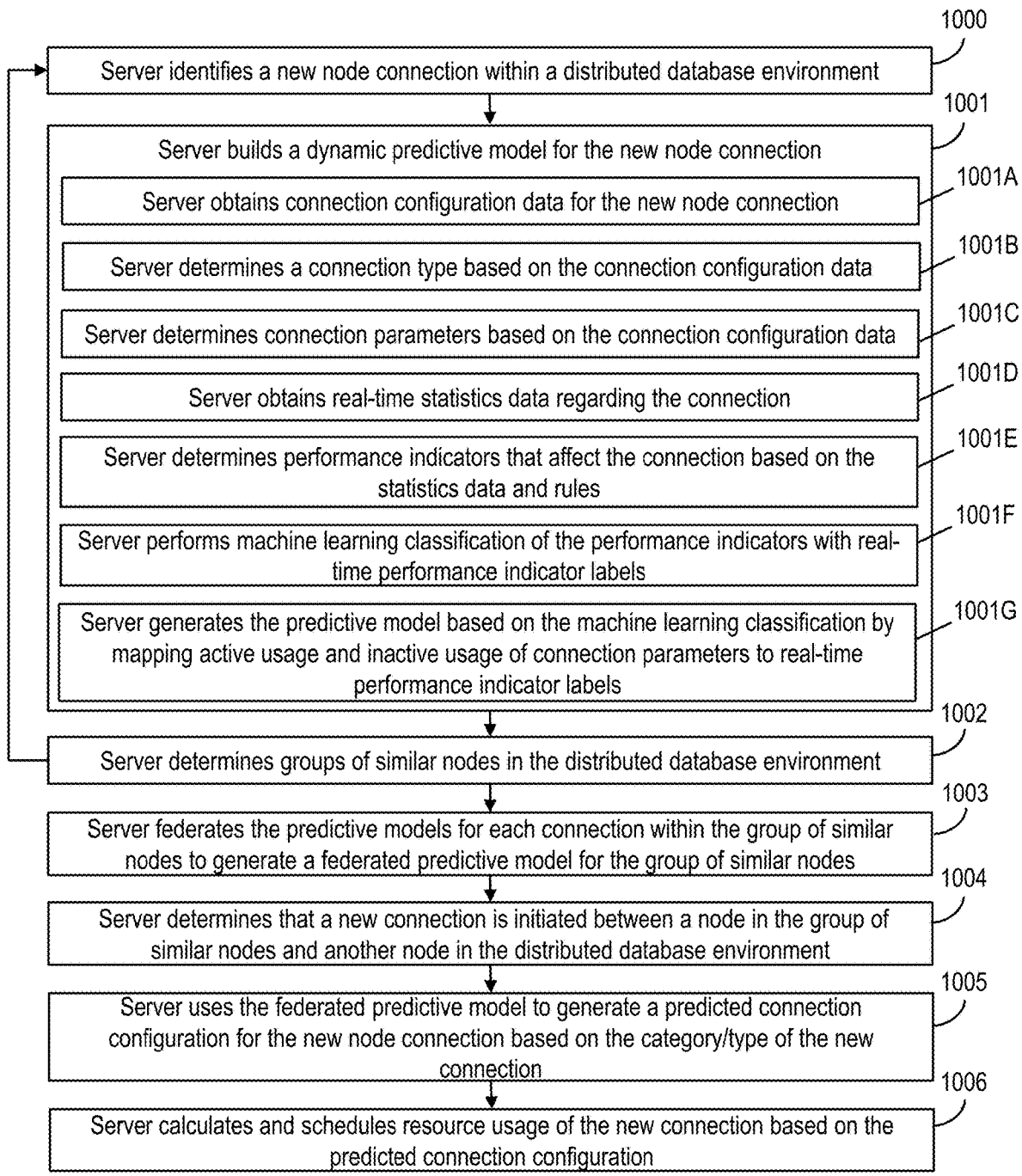
FIG. 10 shows a flowchart of an exemplary method in accordance with aspects of the present disclosure.

FIG. 10 shows a flowchart of an exemplary method in accordance with aspects of the present disclosure. Operations of the method may be carried out in the environment of FIG. 4 and are described with reference to elements depicted in FIG. 4.

At operation 1000, the database server 404 identifies a new node connection (first node connection) within a distributed database environment 400. In embodiments, the status monitoring module 433 of the database server 404 implements operation 1000. In implementations, a connection request of a client device 410 is sent to the connection pool module 420 of the database server 404, and the status monitoring module 433 determines the new node connection based on information from the connection pool module 420.

At operation 1001, the database server 404 builds a dynamic predictive model for the new node connection (first node connection), wherein the predictive model predicts a connection configuration (e.g., connection status and thread usage) to enable the database server 404 to prepare the configuration in advance of a future connection from the same or similar type of node. In embodiments, the distributed database manager module 430 implements operation 1001. In implementations of the disclosure, operation 1001 comprises the following sub-operations 1001A-1001G.

At sub-operation 1001A, the database server 404 obtains connection configuration data for the new node connection. In embodiments, the status monitoring module 433 of the distributed database manager module 430 implements sub-operation 1001A. In implementations, a connection request of a client device 410 includes connection configuration data provided to the database server 404.

At sub-operation 1001B, the database server 404 determines a connection type based on the connection configuration data. In implementations, different connection types of applications (e.g., an application of an application module 440 of a client device 410) may each request a different suite of system resources within the distributed database environment 400. In embodiments, the status monitoring module 433 of the distributed database manager module 430 implements sub-operation 1001B. Exemplary connection types are shown below in Table 2.

TABLE 2

Exemplary Connection Types
DATABASE CONNECTION TYPE DEFINITION

| | |
|---|---|
| 1 | Database (DB) work originated in another local subsystem. Examples: Customer Information Control System (CICS), Information management system (IMS), Time Series Processor (TSP), Message Queuing (MQ), internal DB management |
| 2 | Distribution Work Requests |
| 3 | Query Parallelism |
| 4 | Stored Procedures/Function/Package Examples: Managed stored procedures (run in Work Load Manager (WLM) Application Environments) are external stored procedures. |
| 5 | Native Structured Query Language (SQL) |

As depicted in Table 2, diverse types or categories of database connections may include: database work originating in another local subsystem; distributed work requests; query parallelism; stored procedures/functions/packages; and native structured query language (SQL), for example.

At sub-operation 1001C, the database server 404 determines connection parameters (e.g., CMTSTAT) based on the connection configuration data. In embodiments, the statistics module 431 of the distributed database manager module 430 implements sub-operation 1001C.

At sub-operation 1001D, the database server 404 obtains real-time statistics data regarding the connection. Real-time statistics may include, for example, MAXDBAT, COND-BAT and system performance statistics (e.g., central processing unit (CPU), and Input/Output (I/O) shared wireless access protocol (SWAP) usage and concurrent connection thread statistics). In embodiments, the statistics module 431 of the distributed database manager module 430 implements sub-operation 1001D.

At sub-operation 1001E, the database server 404 determines performance indicators that affect the connection based on the real-time statistics data and predetermined rules. See, for example, the performance indicators in FIG. 9, including table cardinality (tc), page number (pn), access frequency (af), index level (il), leaf page (lp), input/output (i/o) speed (io), system cache (sc), and others ($N_1$-$N_m$). A variety of methods may be utilized to determine performance indicators, and embodiments of the disclosure are not intended to be limited to any examples herein. In implementations, real-time statics data for each connection of a node to another node indicates the performance of the connection, and performance indicators can be determined based on the real-time statistics data, wherein the performance indicators are factors that affect the performance of the connection (e.g., table cardinality, page number, etc.). In embodiments, the analytics module 432 of the distributed database manager module 430 implements sub-operation 1001E. In implementations, the following equation Eq(1) is used to determine performance indicators that affect a connection:

$$\{(B_1,B_2,B_3,B_4\ldots Bn)|PL\}=\Sigma(tc,pn,af,il,lp,io,sc,n1,n2\ldots nm)\times(a1,a2,a4\ldots an) \quad \text{Eq(1)},$$

wherein $B_1$-$B_n$ comprise connection threads and a1-an comprise database runtime statistics, such as MAXDBAT, CONDBAT, and system performance statistics.

At sub-operation 1001F, the database server 404 performs machine learning classification of the performance indicators with performance indicator labels. In embodiments, the usage prediction module 434 of the distributed database manager module 430 implements sub-operation 1001F.

At sub-operation 1001G, the database server 404 generates the dynamic predictive model based on the machine learning classification, by mapping active usage and inactive usage of connection parameters to real-time performance indicator labels. In implementations, the database server 404 assigns priorities to different real-time performance indicator labels according to predetermined rules. Accordingly, in implementations, the dynamic predictive model may assign different rankings or priorities to different real-time performance indicator labels. In embodiments, the usage prediction module 434 of the distributed database manager module 430 implements sub-operation 1001G. See, for example the dynamic predictive model 801 of FIG. 8.

At operation 1002, the database server 404 determines a group of similar nodes in the distributed database environment 400. In embodiments, similar nodes are nodes determined to be of the same type or class having similar characteristics. Various methods for determining similarity of nodes may be used. In implementations, similarity of nodes is determines based on similarity of database activities. Groups of similar nodes may be recognized by a type or category of business or type of business activities (e.g., banking). For example, for a banking business client (e.g., at a client device 410), the primary business activities conducted in the distributed database environment 400 are relatively fixed, so the dynamic predictive model (database usage model) for a connection of the banking business client may be utilized by other banking business clients. It should be understood that the database server 404 may repeat operations 1000-1002 until numerous predictive models have been generated for nodes in the distributed database environment 400, including groups of similar nodes. In embodiments, the analytics module 432 of the distributed database manager module 430 implements operation 1002. In embodiments, the database server 404 vectorizes nodes according to equation Eq(2), and a vector angle is used to calculate the similarity of different node connections.

$$\vec{v}=\Sigma_{k=0}^{N}\vec{P_k} \quad \text{Eq(2)}$$

In implementations, nodes within the distributed database environment 400 may share dynamic predictive models with one another if the connection activities of the nodes are similar. In implementations, the similar nodes work together to build a global predictive model (federated model). Accordingly, in implementations, at operation 1003, the database server 404 federates the dynamic predictive model for each connection within the group of similar nodes determined at operation 1002, thereby generating a federated predictive model for the group of similar nodes. It can be understood that, as new dynamic predictive models are generated by the database server 404 for diverse types/categories of nodes, the corresponding federated predictive models generated by the database server 404 for the diverse types/categories of nodes may be updated with the new dynamic predictive models (from nodes of the same type/category). In implementations, the database server 404 saves the federated predictive model in a database (remote or local to the database server 404) for use with future nodes that are in the same or similar group, and updates and saves the federated predictive model continuously or periodically based on new dynamic predictive models.

At operation 1004, the database server 404 determines that a new node connection (second node connection) request has been made by a node (e.g., a client device 410) in the group of similar nodes to connect to another node (e.g., the database 408A) in the distributed database environment 400. In embodiments, the status monitoring module 433 of the distributed database manager module 430 implements operation 1004. In embodiments, a connection request of a client device 410 is sent to the connection pool module 420 of the database server 404, and the status monitoring module 433 determines the new node connection request has been made based on information from the connection pool module 420.

At operation 1005, the database server 404 uses the federated predictive model generated at operation 1003 to predict a connection configuration for the new node connection (second node connection) request based on the category or type of the new connection. For example, with reference to the group of similar nodes 702A in FIG. 7, the database server 404 may federate the dynamic predictive models for nodes A, B, G and E to generate a federated predictive model according to operation 1003, and then use the federated predictive model to generate a predicted connection configuration for the new node connection (second node connection) 701 of the same type (e.g., banking) as the nodes A, B, G and E.

At operation 1006, the database server 404 calculates and schedules resource usage of the new node connection (second nod connection) based on the predicted connection configuration. In implementations, scheduling resource usage comprises preparing threads based on a predictive need for threads (e.g., transferring one or more threads from a first node to a second node). In one example, there are some connection threads from connection→sql action→commit, which will have some time slices in a database running status (active mode) and some time slices on idle time. When an application connection thread is in idle time, the database server 404 can set the thread into inactive mode, then transfer the thread to another incoming application which is predicted to need an active thread.

The following table shows exemplary results from a comparison of database usage connections between a node and a hybrid database without the use of a federated predictive model and with the use of a federated predictive model. In the exemplary results below, with 128 concurrent database connections, connection creation performance degraded quickly without the use of a federated predictive model as compared to connection creation performance with the use of the federated predictive model. Additionally, use of the federated predictive model resulted in a 60 times faster connection time than without the use of the federated predictive model. Further, the hybrid database experienced connection times in read-only mode (after 512 connections) that were 18 times faster than without the use of the federated predictive model.

TABLE 3

Observed Results from Hybrid Database
Usage Connection on One Node

| ACTIVITY | WITHOUT PREDICTIVE POOL | WITH PREDICTIVE POOL |
|---|---|---|
| 128 Concurrent Connections | Degrades Quickly | No Fluctuation |
| Connections Increase in Read/Write Mode | | 60 times greater than without predictive pool |
| In Read-only Mode, After 512 Connections | | 18 times greater than without predictive pool |

In embodiments, a service provider could offer to perform the processes described herein. In this case, the service provider can create, maintain, deploy, support, etc., the computer infrastructure that performs the processes of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
building, by a computing device, a dynamic machine learning predictive model for a first new node connection in a distributed database environment based on configuration data of the first new node connection;
determining, by the computing device, a group of nodes in the distributed database environment of a same type of node as the first new node connection;
federating, by the computing device, the dynamic machine learning predictive model of the first new node connection with other dynamic machine learning predictive models of other nodes in the group of nodes, thereby generating a federated predictive model for the type of node; and
generating, by the computing device, a predicted connection configuration for a second new node connection of the same type of node using the federated predictive model, the predicted connection configuration including information on connection status and thread usage.

2. The method of claim 1, further comprising identifying, by the computing device, the first new node connection within the distributed database environment.

3. The method of claim 1, further comprising identifying, by the computing device, a connection request has been issued for the second new node connection.

4. The method of claim 1, further comprising calculating and scheduling, by the computing device, resource usage for the second new node connection based on the predicted connection configuration for the second new node connection.

5. The method of claim 4, wherein the scheduling the resource usage for the second new node connection comprises scheduling thread usage.

6. The method of claim 1, wherein the building the dynamic machine learning predictive model comprises:
determining a connection type based on the connection configuration data; determining connection parameters based on the connection configuration data; obtaining real-time statistic data regarding the first new node connection;
determine performance indicators that affect the first new node connection based on the statistics data and rules;
performing machine learning classification of the performance indicators with real-time performance indicator labels; and
generating the dynamic machine learning predictive model by mapping active usage and inactive usage of connection parameters to the real-time performance indicator labels.

7. The method of claim 1, wherein the performance indicators are selected from one or more of the group consisting of: table cardinality; page number; access frequency; index level; leaf page; Input/Output speed; and system cache.

8. The method of claim 1, wherein the computing device includes software provided as a service in a cloud environment.

9. A computer program product comprising one or more computer readable storage media having program instructions collectively stored on the one or more computer readable storage media, the program instructions executable to:
build a self-organized centerless network of nodes in a distributed database environment, the self-organized centerless networks of nodes including a group of nodes of a same type of node;
build a dynamic machine learning predictive model for a first new node connection of a first new node in the distributed database environment based on configuration data of the first new node connection, wherein the first new node is of the same type of node as the group of nodes;
federate the dynamic machine learning predictive model of the first new node connection with other dynamic machine learning predictive models of other nodes in the group of nodes, thereby generating a federated predictive model for the same type of node; and
generate a predicted connection configuration for a second new node connection of a second new node of the same type of node using the federated predictive model, the predicted connection configuration including information on connection status and thread usage.

10. The computer program product of claim 9, wherein the program instructions are further executable to identify the first new node connection within the distributed database environment.

11. The computer program product of claim 9, wherein the program instructions are further executable to identify a connection request has been issued for the second new node connection.

12. The computer program product of claim 9, wherein the program instructions are further executable to calculate and schedule resource usage for the second new node connection based on the predicted connection configuration for the second new node connection.

13. The computer program product of claim 12, wherein the scheduling the resource usage for the second new node connection comprises scheduling thread usage.

14. The computer program product of claim 9, wherein the building the dynamic machine learning predictive model comprises:
- determining a connection type based on the connection configuration data; determining connection parameters based on the connection configuration data; obtaining real-time statistic data regarding the first new node connection;
- determine performance indicators that affect the first new node connection based on the statistics data and rules;
- performing machine learning classification of the performance indicators with real-time performance indicator labels; and
- generating the dynamic machine learning predictive model by mapping active usage and inactive usage of connection parameters to the real-time performance indicator labels.

15. The computer program product of claim 9, wherein the performance indicators are selected from one or more of the group consisting of: table cardinality; page number; access frequency; index level; leaf page; Input/Output speed; and system cache.

16. A system comprising:
- a processor, one or more computer readable storage media, and program instructions collectively stored on the one or more computer readable storage media, the program instructions executable to:
- build a dynamic machine learning predictive model for a first new node connection in a distributed database environment based on configuration data of the first new node connection;
- determine a group of nodes in the distributed database environment of a same type of node as the new node connection;
- federate the dynamic machine learning predictive model of the first new node connection with other dynamic machine learning predictive models of other nodes in the group of nodes, thereby generating a federated predictive model for the same type of node;
- generate a predicted connection configuration for a second new node connection of the same type of node using the federated predictive model, the predicted connection configuration including information on connection status and thread usage; and
- schedule resource usage for the second new node connection based on the predicted connection configuration for the second new node connection.

17. The system of claim 16, wherein the program instructions are further executable to: identify the first new node connection within the distributed database environment; and identify a connection request has been issued for the second new node connection.

18. The system of claim 16, wherein the scheduling the resource usage for the second new node connection comprises scheduling thread usage.

19. The system of claim 16, wherein the building the dynamic machine learning predictive model comprises:
- determining a connection type based on the connection configuration data; determining connection parameters based on the connection configuration data; obtaining real-time statistic data regarding the first new node connection;
- determine performance indicators that affect the first new node connection based on the statistics data and rules;
- performing machine learning classification of the performance indicators with real-time performance indicator labels; and
- generating the dynamic machine learning predictive model by mapping active usage and inactive usage of connection parameters to the real-time performance indicator labels.

20. The system of claim 16, wherein the performance indicators are selected from one or more of the group consisting of: table cardinality; page number; access frequency; index level; leaf page; Input/Output speed; and system cache.

\* \* \* \* \*